(12) United States Patent
Croak et al.

(10) Patent No.: US 7,733,850 B1
(45) Date of Patent: Jun. 8, 2010

(54) METHOD AND APPARATUS FOR ENABLING DYNAMIC CODEC SELECTION ON A PER APPLICATION BASIS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 771 days.

(21) Appl. No.: 11/236,927

(22) Filed: Sep. 27, 2005

(51) Int. Cl.
*H04L 12/66* (2006.01)
*H04L 27/14* (2006.01)
(52) U.S. Cl. .................................. 370/352; 375/326
(58) Field of Classification Search .............. 370/352, 370/353; 375/316
See application file for complete search history.

(56) References Cited

U.S. PATENT DOCUMENTS

| 2002/0001302 A1* | 1/2002 | Pickett | 370/352 |
| 2002/0167937 A1* | 11/2002 | Goodman | 370/352 |
| 2004/0047437 A1* | 3/2004 | Hamiti et al. | 375/326 |

* cited by examiner

*Primary Examiner*—Harry S Hong

(57) ABSTRACT

A method and apparatus for enabling dynamic codec selection on a per application basis are disclosed. Specifically, before establishing call legs to connect VoIP endpoints, the Call Control Element (CCE) consults any invoked application server to determine the preferred codec method and communicates this preference to the appropriate Border Elements involved in the call. The preferred codec method is then negotiated between the corresponding calls legs while the call media path is being established.

14 Claims, 4 Drawing Sheets

200

METHOD AND APPARATUS FOR ENABLING DYNAMIC CODEC SELECTION ON A PER APPLICATION BASIS

The present invention relates generally to communication networks and, more particularly, to a method and apparatus for enabling dynamic codec selection on a per application basis in communication networks, e.g., packet networks such as Voice over Internet Protocol (VoIP) networks.

BACKGROUND OF THE INVENTION

Packet network service providers, e.g., VoIP network service providers can support multiple applications across both enterprise and consumer customers segments. Since customers often use access links that support converged data and voice traffic, it is usually in the best interest of both the customer and the network provider to support low bandwidth codec for voice communications to conserve bandwidth in the access link. Low bandwidth codec, however, does not perform well for some applications such as multi-party conference calls or conversations in noisy environments for in store customer support and higher bandwidth codec should be used instead. Codec, which stands for coder/decoder, is a piece of equipment used to convert and/or compress analog signals, such as voice or video signals, into digital signals for transmission and then convert the digital signals back to the analog signals upon reception.

Therefore, a need exists for a method and apparatus for enabling dynamic codec selection on a per application basis in a packet network, e.g., a VoIP network.

SUMMARY OF THE INVENTION

In one embodiment, the present invention enables dynamic codec selection on a per application basis. Specifically, before establishing call legs to connect to endpoints, e.g., VoIP endpoints, the Call Control Element (CCE) consults any invoked application server to determine the preferred codec and communicates this preference to the appropriate Border Elements involved in the call. The preferred codec is then negotiated between the corresponding calls legs while the call media path is being established. A CCE is a network element that performs call control functions to setup a call. A Border Element is a network element that represents the edge of a VoIP network and serves as a gateway between a customer's network, e.g., a VoIP network, and a Public Switched Telephone Network (PSTN).

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
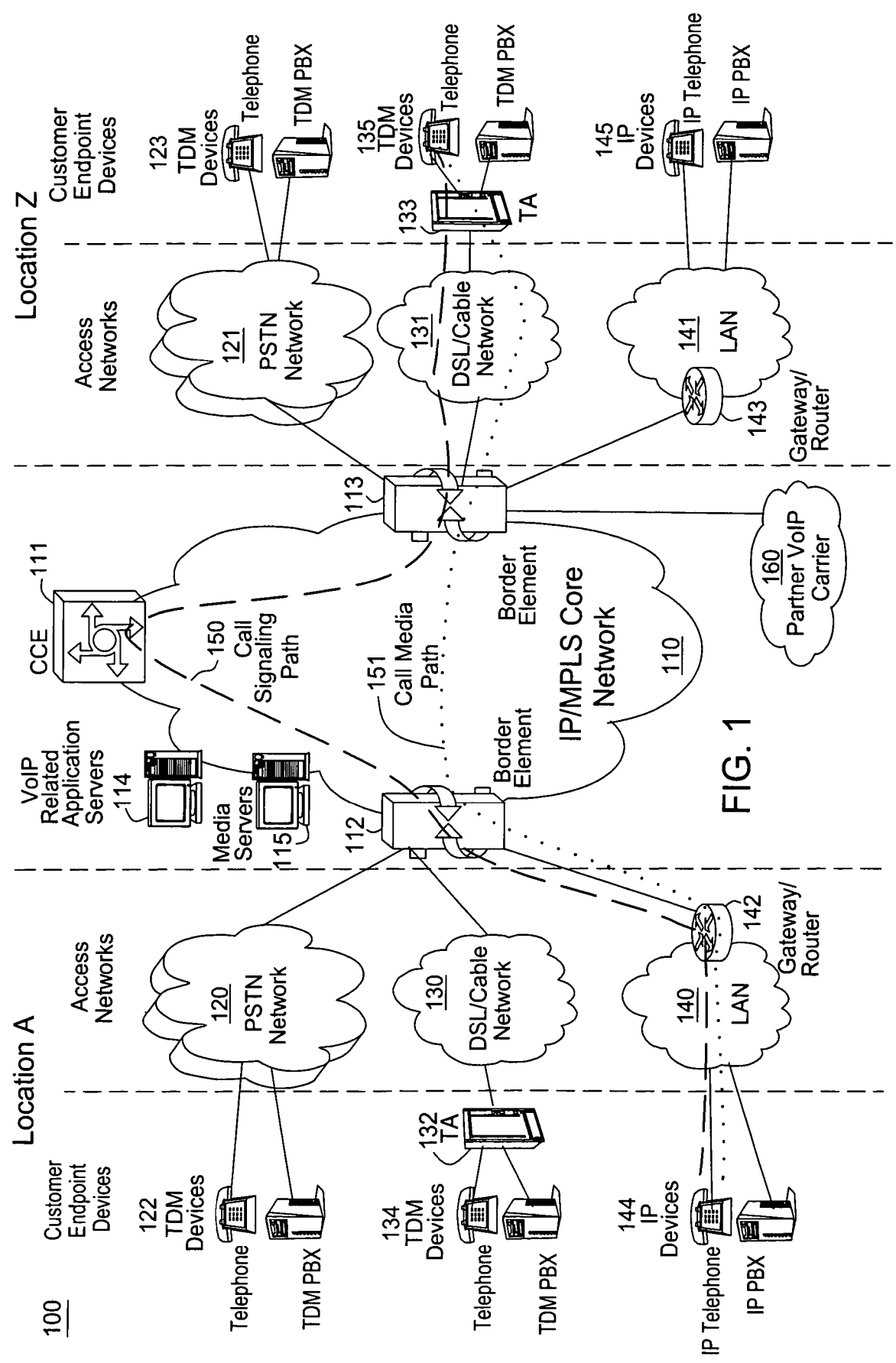
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Packet network service providers, e.g., VoIP network service providers can support multiple applications across both enterprise and consumer customers segments. Since customers often use access links that support converged data and voice traffic, it is usually in the best interest of both the customer and the network provider to support low bandwidth codec for voice communications to conserve bandwidth in the access link. Low bandwidth codec, however, does not perform well for some applications such as multi-party conference calls or conversations in noisy environments for in store customer support and higher bandwidth codec should be used instead. Codec, which stands for coder/decoder, is a piece of equipment used to convert and/or compress analog signals, such as voice or video signals, into digital signals for transmission and then convert the digital signals back to the analog signals upon reception.

To address this need, the present invention enables dynamic codec selection on a per application basis. Specifically, before establishing call legs to connect VoIP endpoints, the Call Control Element (CCE) consults any invoked application server to determine the preferred codec and communicates this preference to the appropriate Border Elements involved in the call. The preferred codec is then negotiated between the corresponding calls legs while the call media path is being established. A CCE is a network element that performs call control functions to setup a call. A Border Element is a network element that represents the edge of a VoIP network and serves as a gateway between a customer's network, e.g., a VoIP network, and a Public Switched Telephone Network (PSTN).

Figure 2:
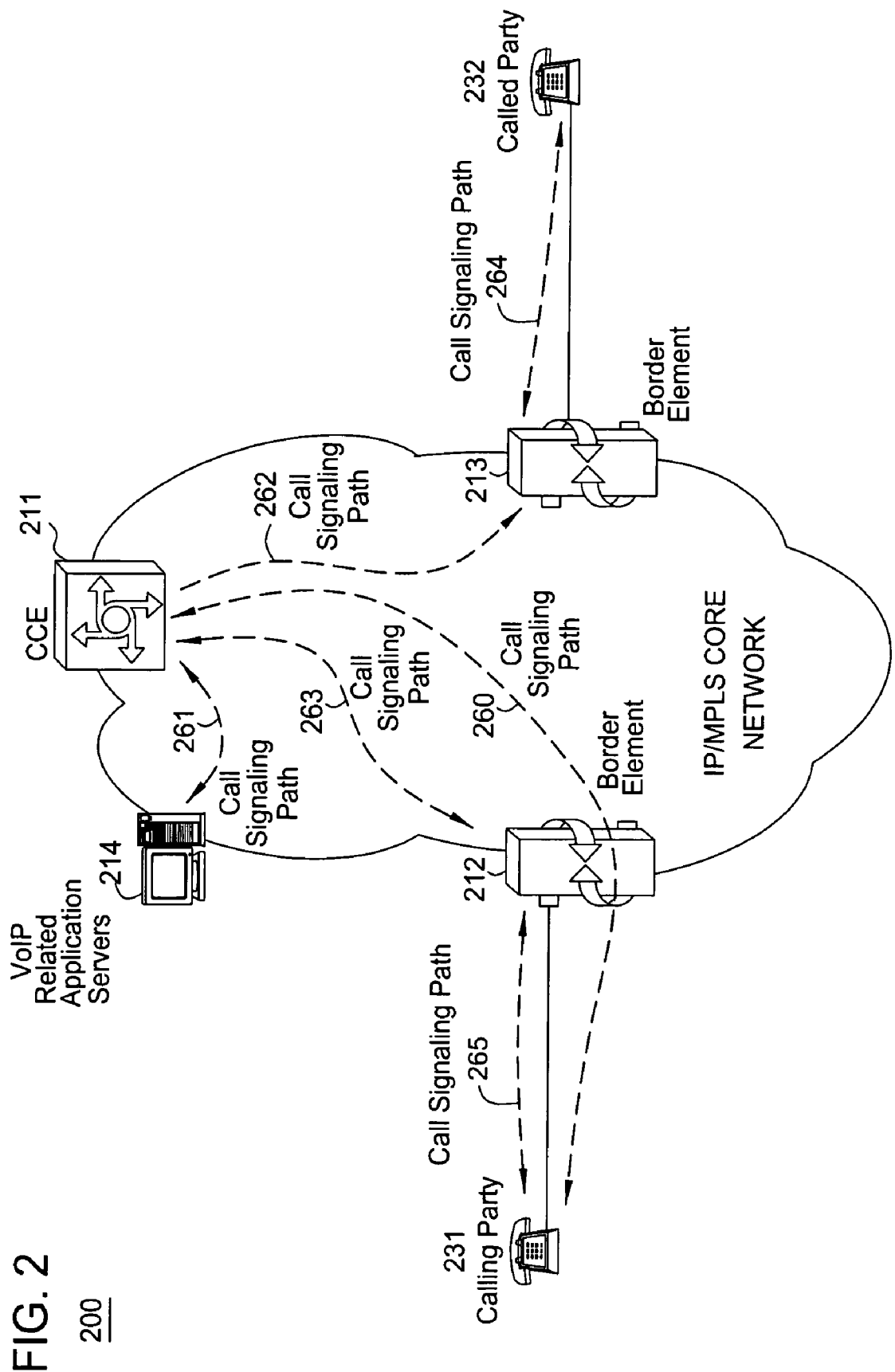
FIG. 2 illustrates an example of enabling dynamic codec selection on a per application basis in a VoIP network of the present invention.

FIG. 2 illustrates an exemplary communication architecture 200 for enabling dynamic codec selection on a per application basis in a packet network, e.g., a VoIP network of the present invention. In FIG. 2, calling party 231 makes a call to called party 232 using signaling path 260. Upon receiving the call setup message, CCE 211 invokes the appropriate AS, such as AS 214, depending on the service features exercised by the call using signaling path 261. In return, AS 214 returns the codec preference to support the call being setup to CCE 211. For instance, a call that invokes a conference call application, the G. 711 codec preference may be returned; a call that invokes a call center application with noisy background environment, the G. 726 codec preference may be returned; and a residential application with a call between 2 residential customers that invokes no special service or application feature, then the G. 729 codec preference may be returned. CCE 211 then communicates the returned codec preference to BE 212 using signaling path 263 and to BE 213 using signaling path 262. Upon receiving the codec preference for a call being setup, BE 212 communicates the codec preference to the endpoint device, e.g., a VoIP endpoint device used by calling party 231 via signaling path 265 and BE 213 communicates the codec preference to the endpoint device, e.g., a VoIP endpoint device used by called party 232 via signaling path 264. If the preferred codec preference cannot be support by a VoIP endpoint device, the appropriate BE will perform the transcoding function. For instance, if the preferred codec is G. 711 but the endpoint device of calling party 231 can only support the G. 726 codec, BE 212 will perform the transcoding function between G. 726 and G. 711 formats. Once the codec negotiation between the network and the VoIP endpoints is finished, the call setup process can then be completed. G.711 is an international standard for encoding telephone audio on a 64 kbps channel. G.726 is an international standard for encoding telephone audio on a 40 kbps, 32 kbps, 24 kbps, or 16 kbps channel. G.729 is an international standard for encoding telephone audio on a 8 kbps channel.

Figure 3:
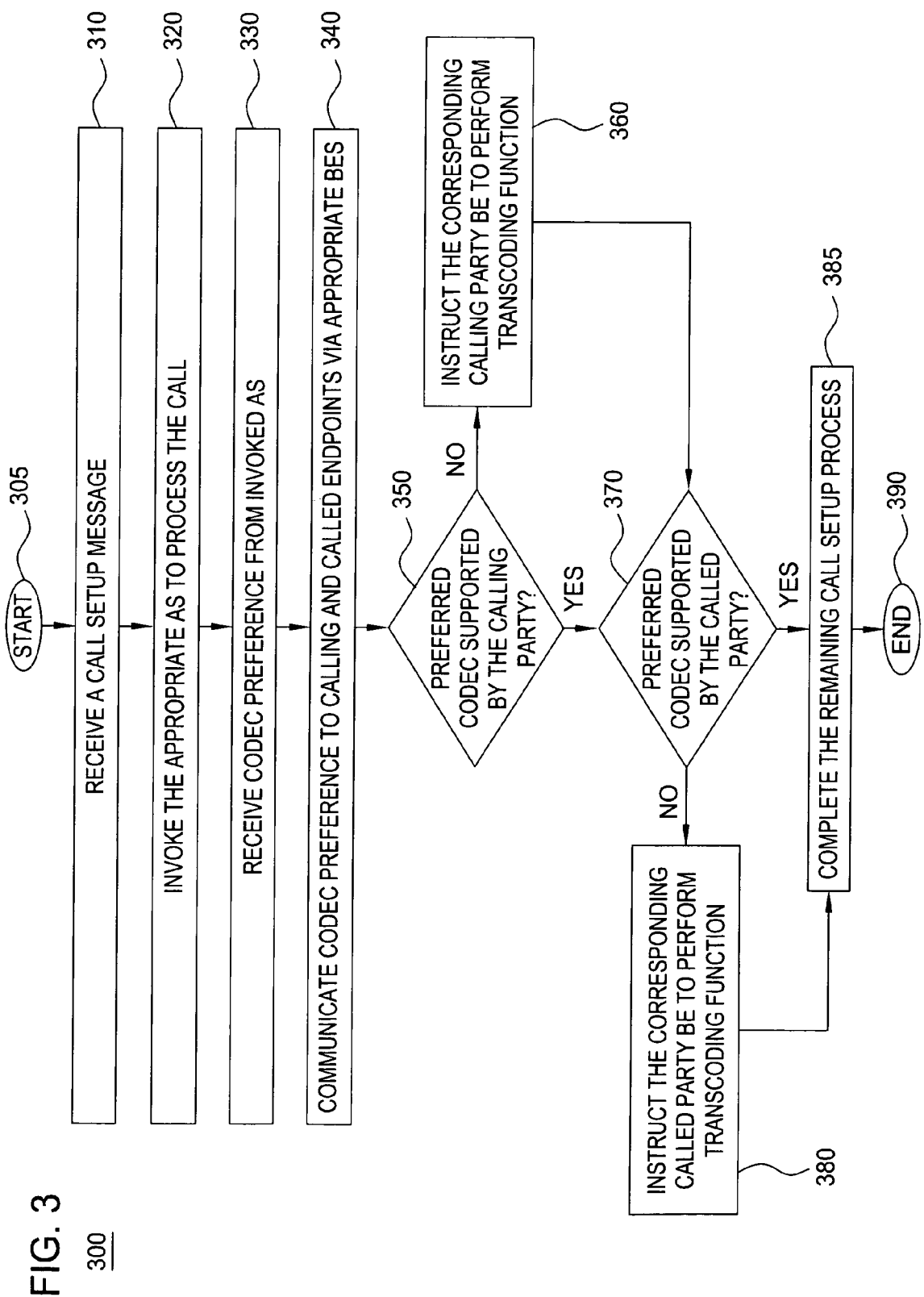
FIG. 3 illustrates a flowchart of a method for enabling dynamic codec selection on a per application basis in a VoIP network of the present invention.

FIG. 3 illustrates a flowchart of a method 300 for enabling dynamic codec selection on a per application basis in a packet network, e.g., a VoIP network of the present invention. Method 300 starts in step 305 and proceeds to step 310.

In step 310, the method receives a call setup signaling message. For example, a call setup signaling message is received from a VoIP endpoint.

In step 320, the method invokes the appropriate AS to process the call setup message, including retrieving the codec preference to be used for the call. For example, the call setup message is received by a CCE and the CCE will then communicate with the appropriate AS.

In step 330, the method receives the preferred codec method to support the call being setup from the invoked AS. In one embodiment, the appropriate codec method is selected in accordance with a particular application. Namely, different application requirements may warrant different codec methods to better serve the call.

In step 340, the method communicates the codec preference to the calling and the called endpoints via their corresponding BEs.

In step 350, the method checks if the preferred codec is supported by the calling party. If the preferred codec is supported by the calling party, the method proceeds to step 370; otherwise, the method proceeds to step 360.

In step 360, the method instructs the BE associated with the calling party to perform transcoding functions between the codec supported by the calling party and the preferred codec.

In step 370, the method checks if the preferred codec is supported by the called party. If the preferred codec is supported by the called party, the method proceeds to step 385; otherwise, the method proceeds to step 380.

In step 380, the method instructs the BE associated with the called party to perform transcoding functions between the codec supported by the called party and the preferred codec.

In step 385, the method completes the remaining call setup procedures. The method ends in step 390.

Figure 4:
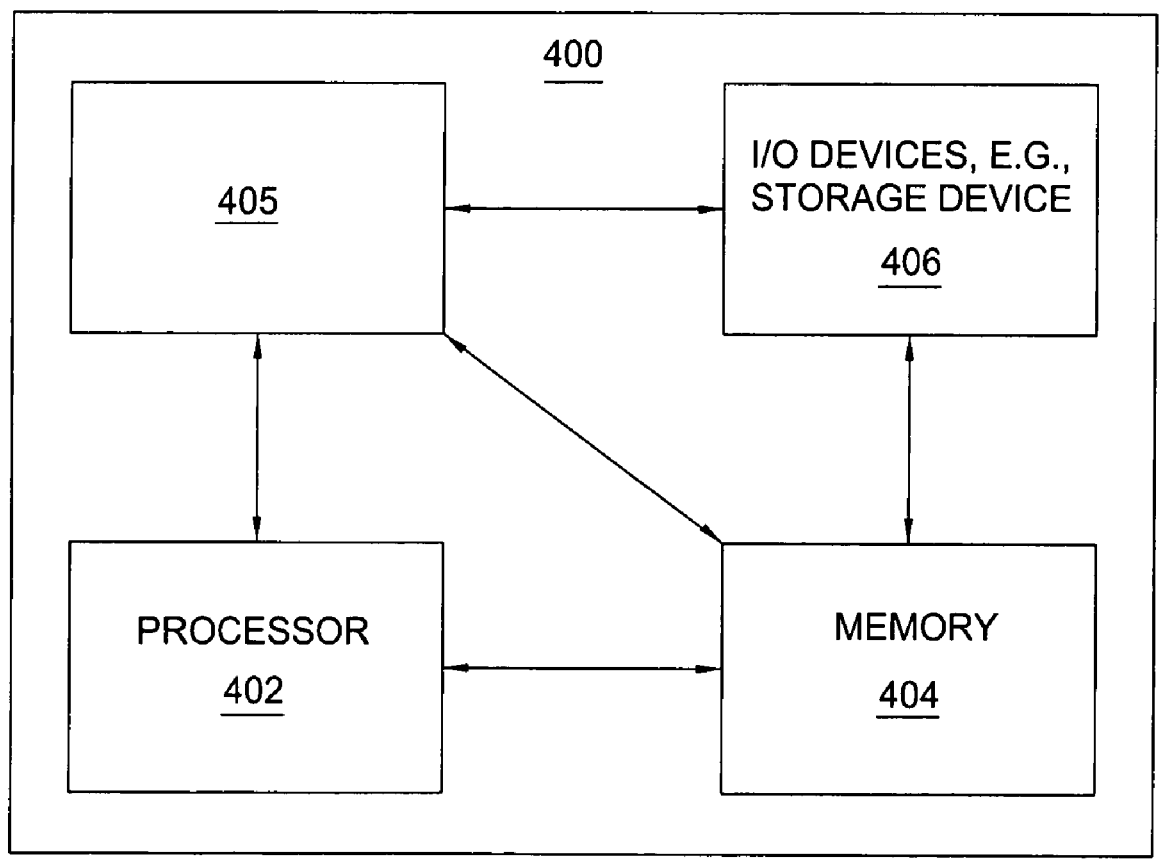
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a dynamic codec selection module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present dynamic codec selection module or process 405 can be loaded into memory 404 and executed by processor 402 to implement the functions as discussed above. As such, the present dynamic codec selection process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling dynamic codec selection in a communication network, comprising:

receiving a call setup message to setup a call between a calling party endpoint device and a called party endpoint device;

selecting, via a processor, a codec method from a plurality of available codec methods, to support the call, where said codec method is selected based on an application associated with said call, wherein said selecting comprises:

determining a codec method that is appropriate in supporting said application of said call; and negotiating said codec method with said calling party endpoint device and said called party endpoint device via corresponding edge network elements of said communication network; and instructing one of said corresponding edge network elements to perform a transcoding function if said calling party endpoint device or said called party endpoint device is not able to support said codec method, wherein said transcoding is performed between said codec method selected for said call and a codec method supported by one of said calling party endpoint device or said called party endpoint device.

2. The method of claim 1, wherein said communication network is a Voice over Internet Protocol (VoIP) network or a Service over Internet Protocol (SoIP) network.

3. The method of claim 1, wherein said call setup message is received by a Call Control Element (CCE).

4. The method of claim 1, wherein said codec method that is deemed appropriate for said application is obtained from an Application Server (AS) by a CCE and communicated to said corresponding edge network elements.

5. The method of claim 1, wherein said corresponding edge network elements are Border Elements (BE).

6. The method of claim 1, wherein said instructing is performed by a Call Control Element (CCE).

7. A computer-readable storage medium having stored thereon a plurality of instructions, the plurality of instructions including instructions which, when executed by a processor, cause the processor to perform steps of a method for enabling dynamic codec selection in a communication network, comprising:

receiving a call setup message to setup a call between a calling party endpoint device and a called party endpoint device;

selecting a codec method from a plurality of available codec methods, to support the call, where said codec method is selected based on an application associated with said call, wherein said selecting comprises:

determining a codec method that is appropriate in supporting said application of said call; and negotiating said codec method with said calling party endpoint device and said called party endpoint device via corresponding edge network elements of said communication network; and instructing one of said corresponding edge network elements to perform a transcoding function if said calling party endpoint device or said called party endpoint device is not able to support said codec method, wherein said transcoding is performed between said codec method selected for said call and a codec method supported by one of said calling party endpoint device or said called party endpoint device.

8. The computer-readable storage medium of claim 7, wherein said communication network is a Voice over Internet Protocol (VoIP) network or a Service over Internet Protocol (SoIP) network.

9. The computer-readable storage medium of claim 7, wherein said call setup message is received by a Call Control Element (CCE).

10. The computer-readable storage medium of claim 7, wherein said codec method that is deemed appropriate for said application is obtained from an Application Server (AS) by a CCE and communicated to said corresponding edge network elements.

11. The computer-readable storage medium of claim 7, wherein said corresponding edge network elements are Border Elements (BE).

12. The computer-readable storage medium of claim 7, wherein said instructing is performed by a Call Control Element (CCE).

13. An apparatus for enabling dynamic codec selection in a communication network, comprising:

means for receiving a call setup message to setup a call between a calling party endpoint device and a called party endpoint device;

means for selecting a codec method from a plurality of available codec methods, to support the call, where said codec method is selected based on an application associated with said call, wherein said means for selecting comprises:

means for determining a codec method that is appropriate in supporting said application of said call; and means for negotiating said codec method with said calling party endpoint device and said called party endpoint device via corresponding edge network elements of said communication network; and means for instructing one of said corresponding edge network elements to perform a transcoding function if said calling party endpoint device or said called party endpoint device is not able to support said codec method, wherein said transcoding is performed between said codec method selected for said call and a codec method supported by one of said calling party endpoint device or said called party endpoint device.

14. The apparatus of claim 13, wherein said communication network is a Voice over Internet Protocol (VoIP) network or a Service over Internet Protocol (SoIP) network.

* * * * *